United States Patent
Saada et al.

(10) Patent No.: US 9,764,843 B2
(45) Date of Patent: Sep. 19, 2017

(54) VEHICLE SEAT COMPRISING AN AREA THAT IS DEFORMABLE IN THE EVENT OF AN IMPACT

(71) Applicant: Expliseat, Paris (FR)

(72) Inventors: Benjamin Jacob Saada, Paris (FR); Jean-Charles Marcel Samuelian, Paris (FR); Vincent Tejedor, Merignac (FR)

(73) Assignee: EXPLISEAT, Paris (FR)

( * ) Notice: Subject to any disclaimer, the term of this patent is extended or adjusted under 35 U.S.C. 154(b) by 0 days.

(21) Appl. No.: 14/766,521

(22) PCT Filed: Feb. 5, 2014

(86) PCT No.: PCT/EP2014/052249
§ 371 (c)(1),
(2) Date: Aug. 7, 2015

(87) PCT Pub. No.: WO2014/122173
PCT Pub. Date: Aug. 14, 2014

(65) Prior Publication Data
US 2015/0367943 A1    Dec. 24, 2015

(30) Foreign Application Priority Data
Feb. 7, 2013  (FR) .................... 13 51063

(51) Int. Cl.
*B64D 11/06* (2006.01)
*B60N 2/42* (2006.01)
*B60N 2/427* (2006.01)

(52) U.S. Cl.
CPC ........ *B64D 11/0619* (2014.12); *B60N 2/4228* (2013.01); *B60N 2/4249* (2013.01);
(Continued)

(58) Field of Classification Search
CPC    B60N 2/427; B60N 2/42709; B64D 11/0619; B64D 11/1647
(Continued)

(56) References Cited
U.S. PATENT DOCUMENTS 3,011,826 A    12/1961  Bowring et al.
3,464,751 A *  9/1969   Barecki ................ B60N 2/4802
                                                 297/216.12
(Continued)

FOREIGN PATENT DOCUMENTS

EP    0 581 592 A1    2/1994
EP    0 945 302 A1    9/1999
(Continued)

OTHER PUBLICATIONS

International Search Report and Written Opinion for PCT Application No. PCT/EP2014/052249 dated Jul. 7, 2014.
(Continued)

*Primary Examiner* — Robert Canfield
(74) *Attorney, Agent, or Firm* — Nixon Peabody LLP; Khaled Shami (57) ABSTRACT

A vehicle seat for a passenger, comprising a backrest having a front face directed towards the passenger and a rear face opposite the front face, and a seat part having an upper face directed towards the passenger and a lower face opposite the upper face, wherein the rear face of the backrest and/or the lower face of the seat part comprise(s) at least one area that is deformable in the event of an impact, towards the front face of the backrest and/or towards the upper face of the seat part respectively, and in that the front face and rear face of the backrest, and/or the upper face and lower face of the seat part are located at a distance from each other, at least at said at least one deformable area, so as to define a clearance space, said at least one deformable area of the rear face of
(Continued)

the backrest and/or of the lower face of the seat part being configured so as to deform into the clearance space in the event of an impact on the rear face of the backrest and/or the lower face of the seat part, without transmitting the impact to the front face of the backrest and/or the upper face of the seat part respectively.

12 Claims, 9 Drawing Sheets (52) U.S. Cl.
 CPC .......... *B60N 2/42709* (2013.01); *B64D 11/06* (2013.01); *B64D 11/0647* (2014.12); *B64D 11/0649* (2014.12); *Y02T 50/46* (2013.01); *Y10T 29/49909* (2015.01)

(58) Field of Classification Search
 USPC ............... 297/216.1, 216.13, 216.14, 452.37
 See application file for complete search history.

(56) References Cited

U.S. PATENT DOCUMENTS

| | | | | |
|---|---|---|---|---|
| 3,537,751 A * | 11/1970 | Inoue | ................... | B60N 2/4221 297/216.14 |
| 3,654,635 A | 4/1972 | Cruden, Jr. | | |
| 4,558,905 A * | 12/1985 | Natori | ................... | A47C 7/748 297/452.6 |
| 5,054,845 A * | 10/1991 | Vogel | ................. | B60N 2/42709 297/216.14 |
| 5,338,098 A * | 8/1994 | Ohnishi | ............... | B60N 2/5825 297/452.6 |
| 5,460,308 A | 10/1995 | Hahn | | |
| 6,964,451 B1 * | 11/2005 | Bergey | ................. | B60N 2/4242 188/371 |
| 7,222,915 B2 * | 5/2007 | Philippot | ................. | B60N 2/70 297/216.13 |
| 7,338,119 B2 * | 3/2008 | Burch | ................... | B60N 2/242 297/216.13 |
| 7,591,510 B1 | 9/2009 | Giampavolo | | |
| 8,328,289 B2 | 12/2012 | Tharp | | |
| 8,434,826 B2 * | 5/2013 | Zynda | ................... | B29C 44/18 264/45.1 |
| 8,646,743 B2 | 2/2014 | Salerno | | |
| 9,327,835 B2 * | 5/2016 | Saada | ................... | B64D 11/06 |
| 9,440,568 B2 * | 9/2016 | Hong | ................... | B60N 2/7011 |
| 2003/0127902 A1 * | 7/2003 | Fujita | ................. | B60N 2/42709 297/452.48 |
| 2005/0189802 A1 * | 9/2005 | Mattes | ................... | B60N 2/242 297/216.13 |
| 2007/0029861 A1 * | 2/2007 | Krauth | ..................... | B60N 2/68 297/452.18 |
| 2010/0052378 A1 * | 3/2010 | Marriott | ................. | B60N 2/242 297/216.1 |
| 2013/0257119 A1 * | 10/2013 | Roberts | ................... | B60N 2/427 297/216.13 |
| 2013/0307310 A1 * | 11/2013 | Saada | ................... | B60N 2/686 297/452.2 |
| 2014/0015290 A1 * | 1/2014 | Saada | ................... | B64D 11/06 297/216.13 |
| 2014/0300171 A1 * | 10/2014 | Velasco | ................. | B64D 11/06 297/452.18 |

FOREIGN PATENT DOCUMENTS

| | | | |
|---|---|---|---|
| EP | 1 752 573 A2 | | 2/2007 |
| EP | 2 414 234 A2 | | 2/2012 |
| EP | 2 445 763 A2 | | 5/2012 |
| JP | 2001-084227 A | | 4/2011 |
| JP | 2011084227 A | * | 4/2011 |
| KR | 2012-0040539 A | | 4/2012 |
| WO | 2008/143249 A1 | | 11/2008 |
| WO | 2012/052823 A2 | | 4/2012 |

OTHER PUBLICATIONS

Preliminary French Search Report for French Application No. 13 51063 dated Aug. 30, 2013.
Final Office Action, dated May 25, 2016, issued in U.S. Appl. No. 14/350,360, 8 pages.

\* cited by examiner

VEHICLE SEAT COMPRISING AN AREA THAT IS DEFORMABLE IN THE EVENT OF AN IMPACT

CROSS-REFERENCE TO RELATED PATENT APPLICATION

The present application is a National Stage Application of International Application No. PCT/EP2014/052249 entitled "VEHICLE SEAT COMPRISING AN AREA THAT IS DEFORMABLE IN THE EVENT OF AN IMPACT"filed Feb. 5, 2014, which claims priority to French Patent Application Number 13 51063 filed Feb. 7, 2013, the contents of which are incorporated herein by reference in their entirety.

TECHNICAL FIELD

This invention relates to the field of transporting passengers, among others collectively, in particular by road, rail or air. It relates more particularly to the field of passenger seats.

The invention relates as such to a vehicle seat for a passenger, a vehicle comprising such a seat, as well as to a set of at least two adjacent vehicle seats and an associated method of manufacture.

PRIOR ART

The volume and the weight of seats are concerns for which it is sought to respond in order to decrease the environmental footprint of the transport, in particular in means of collective transport. The decrease in the volume and in the weight of the seats must not however affect the safety of the passengers.

In air transport in particular, reducing the volume and the weight of seats is exacerbated by the energy required for a given flight. As safety is an unavoidable element, strategies for lightening must be done without compromising the resistance of the seat. By reducing the unit volume of the seats, it is possible to reduce the space between two successive rows of seats and to increase the number of passengers that can have a seat in aircraft or, inversely, to increase the space devoted to each passenger. A better filling of the aircraft makes it possible, at a constant flow of passengers on an airline, to decrease the number of flights. Likewise, the reduction in the unit weight of the seats limits the energy required for a given flight and the fuel required for these flights is therefore saved, which reduces by as much the greenhouse gas emissions.

Conventional vehicle seats, in particular for aircraft, integrate rigid plates on the backrest in order to guarantee the comfort of the passenger of the seat, and to limit the transmission of the impacts on the rear of the backrest. In a collective means of transport, these impacts can be linked to the passenger located behind the seat: the knees of the latter can for example tap in the rear of the backrest, and can disturb the passenger seated on the seat under consideration.

By way of example, patent application WO 2012/052823 A2 discloses an advanced seat backrest, wherein a first rigid plate makes it possible to support the foam for the passenger seated on the seat under consideration, and wherein a second rigid plate makes it possible to stop the knees of the passenger located at the rear of the seat. The double rigid layer formed as such makes it possible to partially prevent the transmission of impacts to the passenger seated on the seat under consideration. As the two rigid plates are however fixed onto the same support, the shock waves can propagate from the rear face to the front face of the backrest via the fastenings of the rigid plates.

Patent application JP 2011-084227 A further discloses a backrest for a refined vehicle seat, where again a rigid plate is inserted into the backrest, behind a fabric layer. This plate is again fastened to the same structure as the front portion of the backrest of the seat, inducing as described above a transmission of the impacts from the rear face to the front face of the backrest.

Moreover, in the event of an impact, the use of an inflatable cushion (or airbag) makes it possible to attenuate the knees of a passenger located at the rear of a seat under consideration. Patent application KR 2012-0040539 A discloses for example an inflatable cushion located at the rear of a seat in order to attenuate the passenger behind the seat under consideration. Likewise, patent application EP 2 445 763 A2 describes the use of an active inflation device in order to attenuate the knees of a passenger in the event of an accident.

Finally, patent application EP 2 414 234 A2 discloses a seat of which the structure is agglomerated in an absorbent foam. The insulation strategy between the rear and front faces of the backrest of the seat resides here in the use of a deformable and absorbent foam. This strategy leads to a rather heavy backrest, and limits the transmission of small impacts without however preventing the impacts reaching the support structure from being transmitted.

DISCLOSURE OF THE INVENTION

The invention has for purpose to overcome at least partially the needs mentioned hereinabove and the disadvantages relating to the realizations of prior art.

The invention aims in particular to allow for the attenuation of impacts sustained by a vehicle seat for a passenger, in particular impacts sustained on the rear of the backrest of the seat, while simultaneously preventing the transmission of such impacts to the passenger of the seat, in particular on the front of the backrest of the seat.

As such, the invention proposes to design an effective isolation system of the front and rear portions of a seat, in particular the front and rear faces of the backrest of the seat, without increasing the mass.

The invention also has for purpose to propose a seat provided with a fine and light seat part and/or with a backrest, preventing the transmission to the passenger of the seat of the impacts sustained at the rear and/or under the seat.

In particular, this invention was designed in the spirit of the problems mentioned hereinabove, namely: reducing the weight and the unit volume of the seats, guarantee of safety for passengers, increase in comfort.

The invention has as such for object, according to one of its aspects, a vehicle seat for a passenger, comprising:
a backrest having a front face directed towards the passenger and a rear face opposite the front face, and
a seat part having an upper face directed towards the passenger and a lower face opposite the upper face,
characterised in that the rear face of the backrest and/or the lower face of the seat part comprises at least one area that is deformable in the event of an impact, respectively towards the front face of the backrest and/or towards the upper face of the seat part,
and in that the front and rear faces of the backrest, and/or the upper and lower faces of the seat part, are located at a distance from each other, at least one said at least one area that is deformable, so as to define a clearance space, said at least one area that is deformable of the rear face of the backrest and/or of the lower face of the seat part being configured so as to deform, in the event of an impact sustained on the rear face of the backrest and/or the lower face of the seat part, in the clearance space without transmitting the impact, respectively in the front face of the backrest and/or the upper face of the seat part.

The clearance space can allow for the clearance of the rear face of the backrest to the front face of the backrest and/or the clearance of the lower face of the seat part to the upper face of the seat part.

Thanks to the invention, it can be possible to attenuate the impacts sustained by the seat, in particular the impacts sustained on the rear face of the backrest and/or on the lower face of the seat part, while still preventing, or at the least limiting, the transmission of these impacts to the passenger, in particular towards the front face of the backrest and/or towards the upper face of the seat part. The impact can, for example, be provoked by the contact of a knee, an elbow or a foot. The invention can as such make it possible for example that the blows given by the passenger located on the seat behind the seat under consideration, in particular blows of the knees on the rear face of the backrest and/or kicks on the lower face of the seat part, are not felt by the passenger seated on the seat under consideration. The invention can therefore make it possible to have an isolation system of the rear and front portions of the seat, in particular of the rear and front faces of the backrest of the seat and/or of the lower and upper faces of the seat part of the seat, by using a principle of deforming the surface and spacing between the rear and front portions of the seat, in particular between the rear and front faces of the backrest of the seat and/or the lower and upper faces of the seat part of the seat. Also, the invention can generally allow for a savings in weight in relation to a conventional system, a simplification in the installation and recycling, and an improvement in the safety of the passenger. It is particularly advantageous for the collective transport of passengers, in particular by road, rail or air.

The seat according to the invention can further comprise one or several of the following characteristics taken individually or in any technically permissible combination.

Said at least one area that is deformable can be configured to be deformed, in the event of an impact sustained on the rear face of the backrest and/or the lower face of the seat part, in the clearance space without entering into contact respectively with the front face of the backrest and/or the upper face of the seat part.

Said at least one area that is deformable can be able to be deformed, during the impact, in the clearance space, towards the front face of the backrest and/or the upper face of the seat part, as long as the fastening of the rear face of the backrest and/or of the lower face of the seat part, comprising said at least one area that is deformable, to the fixed structure of the seat or of the compartment of the vehicle guarantees a separation between the two front and rear faces of the backrest and/or the two lower and upper faces of the seat part, in other words as long as the clearance space allows for the absence of contact between the front and rear faces of the backrest and/or the upper and lower faces of the seat part. In particular, the clearance space can be configured to prevent the transmission of the impact from the rear face of the backrest, or the lower face of the seat part, towards the front face of the backrest, or respectively the upper face of the seat part.

The rear face of the backrest and/or the lower face of the seat part can comprise said at least one area that is deformable in at least one predetermined area, in particular an area able to undergo an impact, for example at the probable location of impact on the backrest of the knees of the passenger located at the rear of the seat under consideration and/or at the probable location of impact on the seat part of the feet of the passenger located at the rear of the seat under consideration.

The rear face of the backrest and/or the lower face of the seat part can comprise at least one non-deformable area outside of said at least one area that is deformable, said at least one non-deformable (rigid) area being for example carried out using a plastic or metal material.

The rear face of the backrest and/or the lower face of the seat part comprising said at least one area that is deformable can comprise a braided and/or woven and/or knitted fabric having at least two areas having different resistances to penetration, with at least one of these areas forming said at least one area that is deformable, in particular a penetration resistance area that is the highest.

Alternatively, the rear face of the backrest and/or the lower face of the seat part comprising said at least one area that is deformable can comprise a woven and/or knitted fabric structure with uniform braiding and/or weaving and/or knitting, said at least one area that is deformable being obtained through a geometrical configuration that is different from the fixed structure of the seat in relation to the geometrical configuration of the deformable area before it is fastened onto the fixed structure.

Said at least one area that is deformable can extend over at least one recess of the fixed structure of the seat, with the thickness of the fixed structure defining the clearance space, with the fixed structure being made of a rigid material, in particular of a composite material and/or plastic and/or metal.

The rear face of the backrest and/or the lower face of the seat part comprising said at least one area that is deformable can be fastened to the fixed structure of the seat by means of at least one reversible hook, in particular a press-button, a zipper, a Velcro fastener, a screwing and/or a bolting.

Alternatively, the rear face of the backrest and/or the lower face of the seat part comprising said at least one area that is deformable can be fastened to the fixed structure of the seat by means of at least one irreversible hook, in particular by gluing, welding, sewing and/or riveting.

The clearance space can be empty. Alternatively, the clearance space can be filled with an elastically deformable material, in particular a foam.

The invention also has for object, according to another of its aspects, a set of at least two adjacent vehicle seats, characterised in that it comprises at least two adjacent seats such as defined hereinabove, and in that at least one same deformable area is common to said at least two seats, extending in particular over the rear faces of the backrests of said at least two seats and/or over the lower faces of the seat parts of said at least two seats.

The invention further has for object, according to another of its aspects, a vehicle comprising a seat such as defined hereinabove or a set of at least two vehicle seats such as defined hereinabove.

"Vehicle" means any means of transport or of displacement of at least one passenger, for example a plane, a car, a train, a stroller, a cable car, a chairlift, a boat, a nacelle of an amusement park ride, among others.

The rear face of the backrest and/or the lower face of the seat part comprising said at least one area that is deformable can be fastened to a fixed structure of at least one seat.

The rear face of the backrest and/or the lower face of the seat part comprising said at least one area that is deformable can further be fastened to a fixed structure of the compartment of the vehicle.

The invention further has for object, according to another of its aspects, a method for manufacturing a vehicle seat such as defined hereinabove, wherein a braided and/or woven and/or knitted fabric is assembled, intended to form at least partially the rear face of the backrest and/or the lower face of the seat part comprising said at least one area that is deformable, on a fixed structure of the seat.

The seat and the method according to the invention can comprise any one of the previously mentioned characteristics, taken individually or according to any technically permissible combinations with other characteristics.

BRIEF DESCRIPTION OF THE DRAWINGS

The invention can be better understood when reading the following detailed description, of examples of unrestricted implementations of the latter, as well when examining the figures, diagrammatical and partial, of the annexed drawing, wherein.

In all of these figures, identical references can designate identical or similar elements.

In addition, the various portions shown in the figures are not necessarily shown according to a uniform scale, in order to make the figures more legible.

DETAILED DISCLOSURE OF PARTICULAR EMBODIMENTS

In reference to FIGS. 1 to 8, example embodiments of the invention shall be described hereinafter.

Figure 1A:
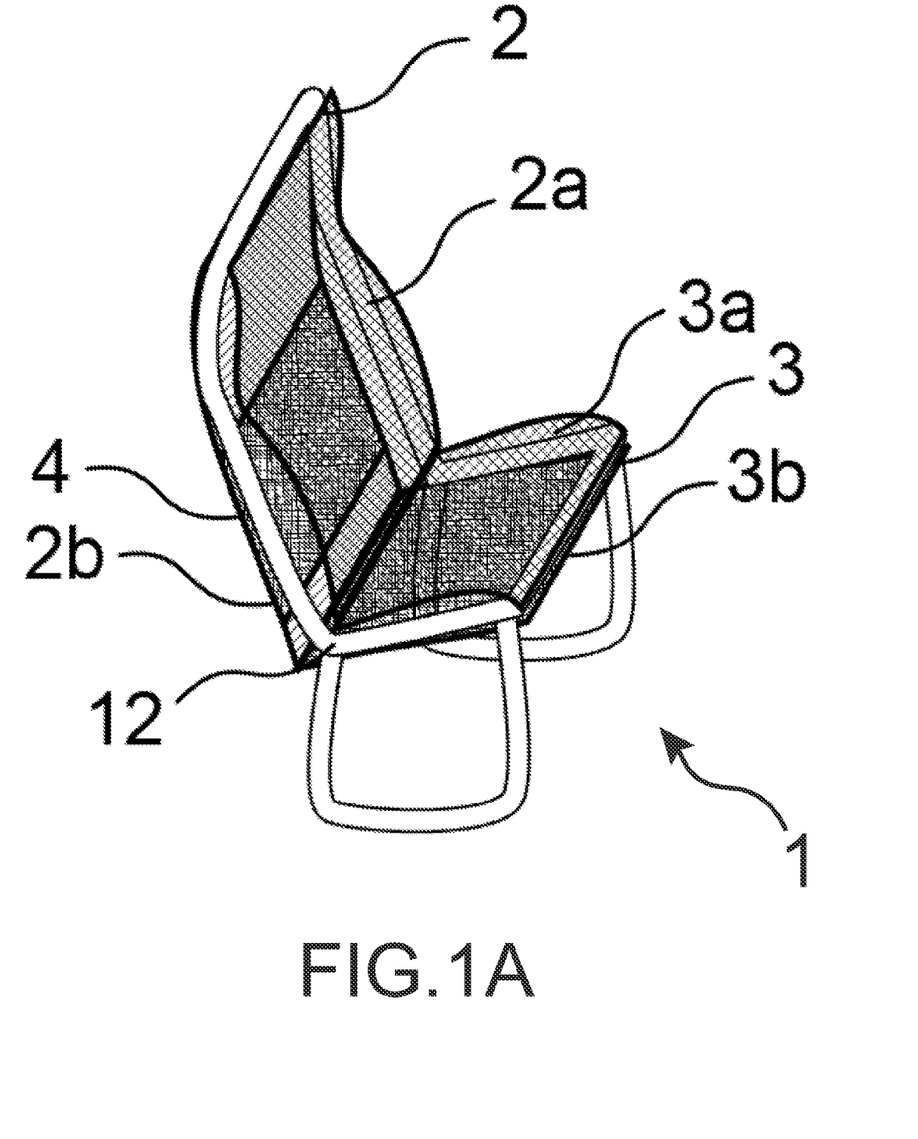
FIGS. 1A and 1B are perspective views, respectively exploded and assembled, of a seat in accordance with the invention.
Figure 1B:
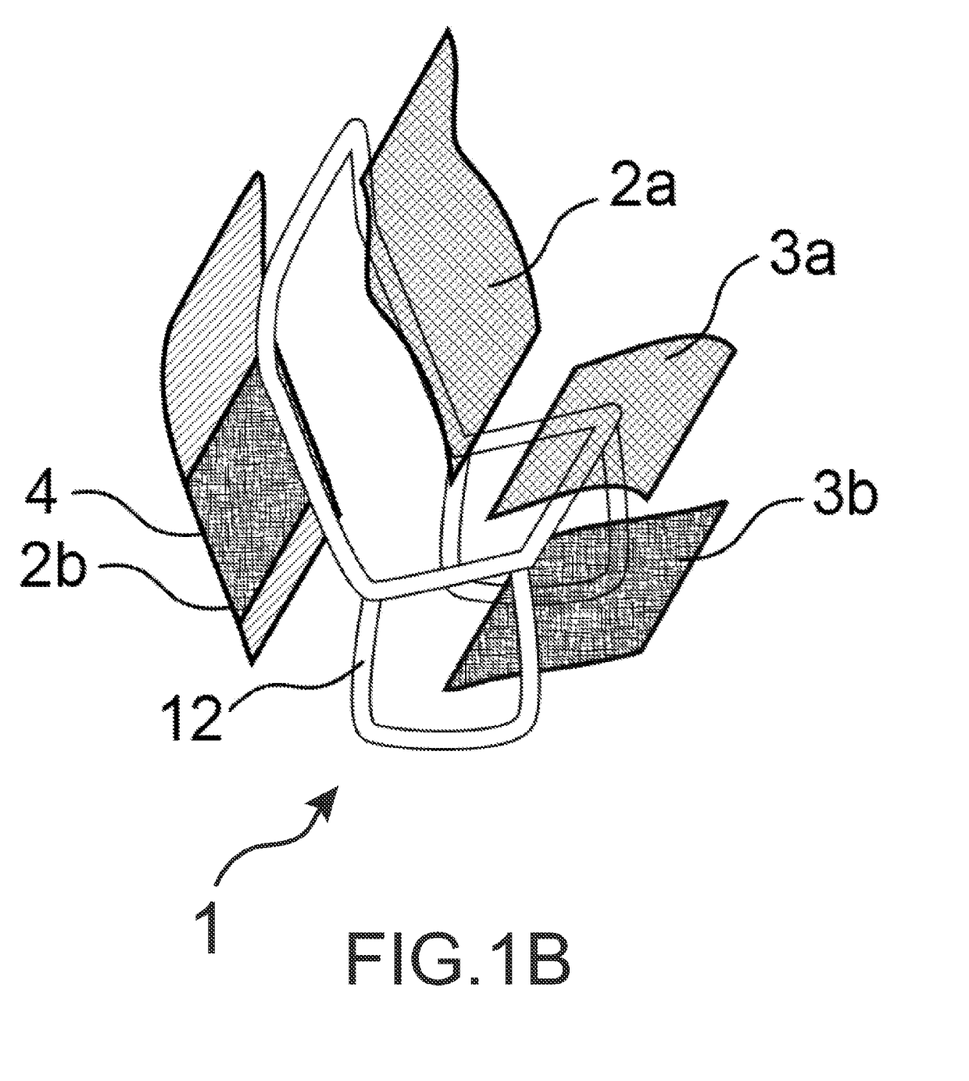

FIGS. 1A and 1B show, in perspective, respectively as an exploded and as an assembled view, an example of adjacent vehicle seat 1 for passengers according to the invention.

The vehicle seat 1 comprises a backrest 2 having a front face 2a directed towards the passenger seated on the seat 1 and a rear face 2b opposite the front face 2a, as well as a seat part 3 having an upper face 3a directed towards the passenger seated on the seat 1 and a lower face 3b opposite the upper face 3a.

In accordance with the invention, the rear face 2b of the backrest 2 of the seat 1 comprises a deformable area 4 in the event of an impact towards the front face 2a of the backrest 2. Such an impact can for example correspond to blows of the knees given by a passenger seated on the seat behind the seat 1 under consideration.

More specifically, a deformable area 4 extends over the rear face 2b of the backrest 2.

Figure 2:
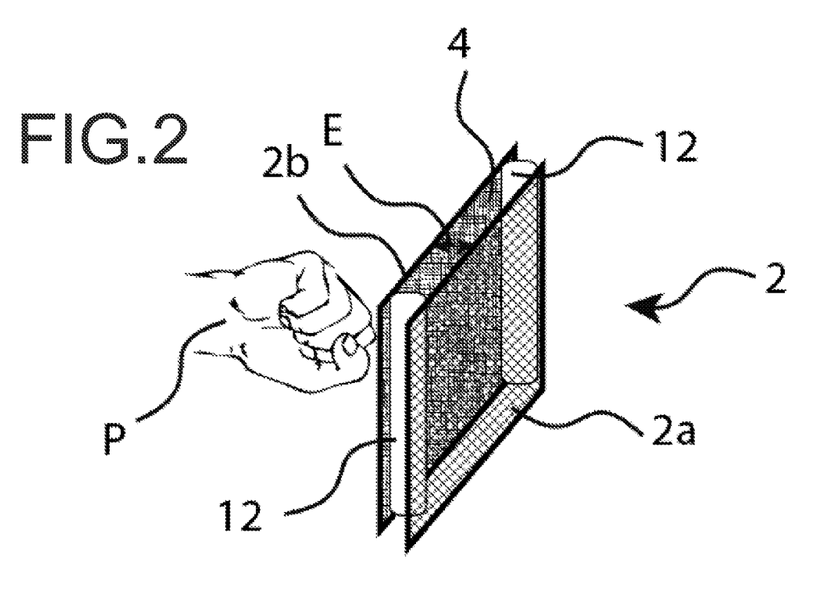
FIG. 2 is a partial perspective view of the front and rear faces of the backrest of a seat in accordance with the invention, before an impact sustained on the rear face of the backrest.
Figure 3:
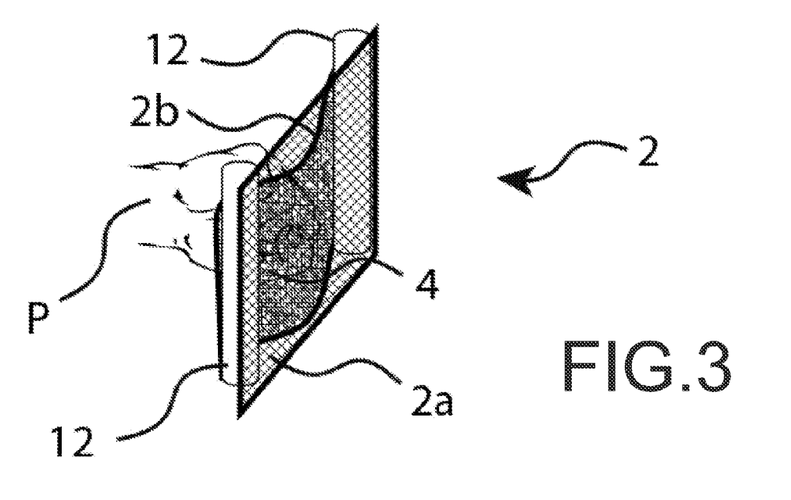
FIG. 3 is a partial perspective view of the front and rear faces of the backrest of FIG. 2, during the impact sustained on the rear face of the backrest.

In reference to FIGS. 2 and 3, in order to absorb the impact or impacts sustained on the backrest 3 and in order to not affect the comfort of the passengers seated on the seat 1, the deformable area 4 is advantageously configured to be deformed in the clearance spaces E, with each clearance space E being defined by the distance separating the deformable area 4 on the rear face 2b of the backrest 2 and the front face 2a of the backrest 2. In the case of a set of several adjacent seats, there are as many clearance spaces E, namely one for each vehicle seat 1. Each clearance space E is defined or delimited by the fixed structure 12 of each seat 1, and by the front face 2a of the backrest 2 of the seat 1 and the seat 4 that is deformable.

The deformation of the deformable area 4, in the event of an impact, is done without transmitting the impact towards the front faces 2a of the backrest 2. More particularly, the deformable area 4 is configured to be deformed, during the impact, in the clearance spaces E without entering into contact with the front faces 2a of the backrests 2.

In this way, the invention can make it possible to have a deformable area 4 on the rear face 2b of the backrest 2 which is sufficiently deformable (sufficiently flexible) to attenuate the impact and allow for the comfort of the passenger located behind the seat 1 under consideration, for example to allow for comfort on the knees, but also provided to prevent the transmission of the impact towards the front face 2a of the backrest 2 and as such preserve the comfort of the passenger seated on the seat 1. The deformable area 4 can as such be both sufficiently flexible for the attenuation of the impact and sufficiently rigid so as not to be deformed in the clearance space E until entering into contact with the front face 2a of the backrest 2.

The clearance space E can be empty, i.e. no element is inserted between the rear face 2b and the front face 2a of the backrest 2. Alternatively, the clearance space E can be filled with an elastically deformable material, for example a foam.

Figure 9:
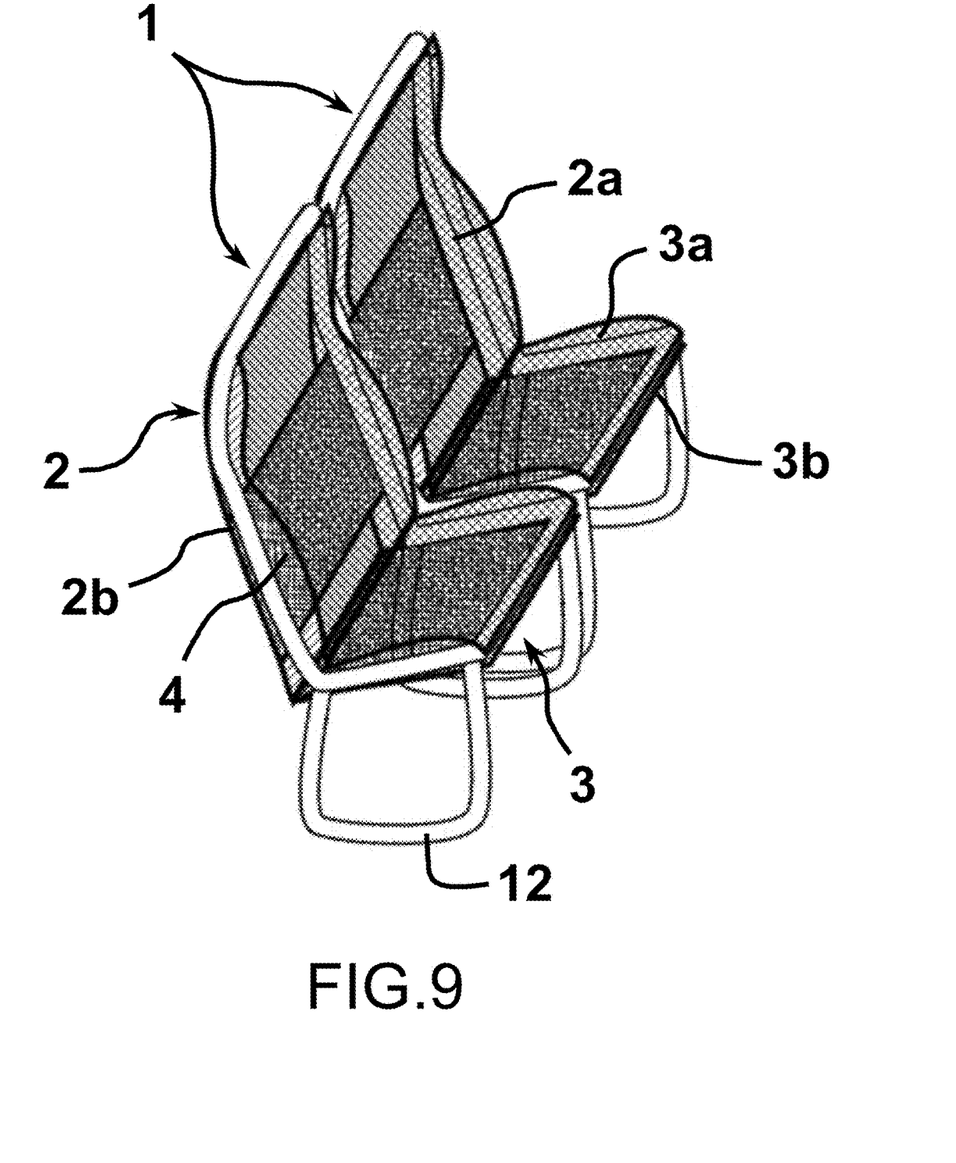
FIG. 9 shows a set of adjacent seats.
Figure 10:
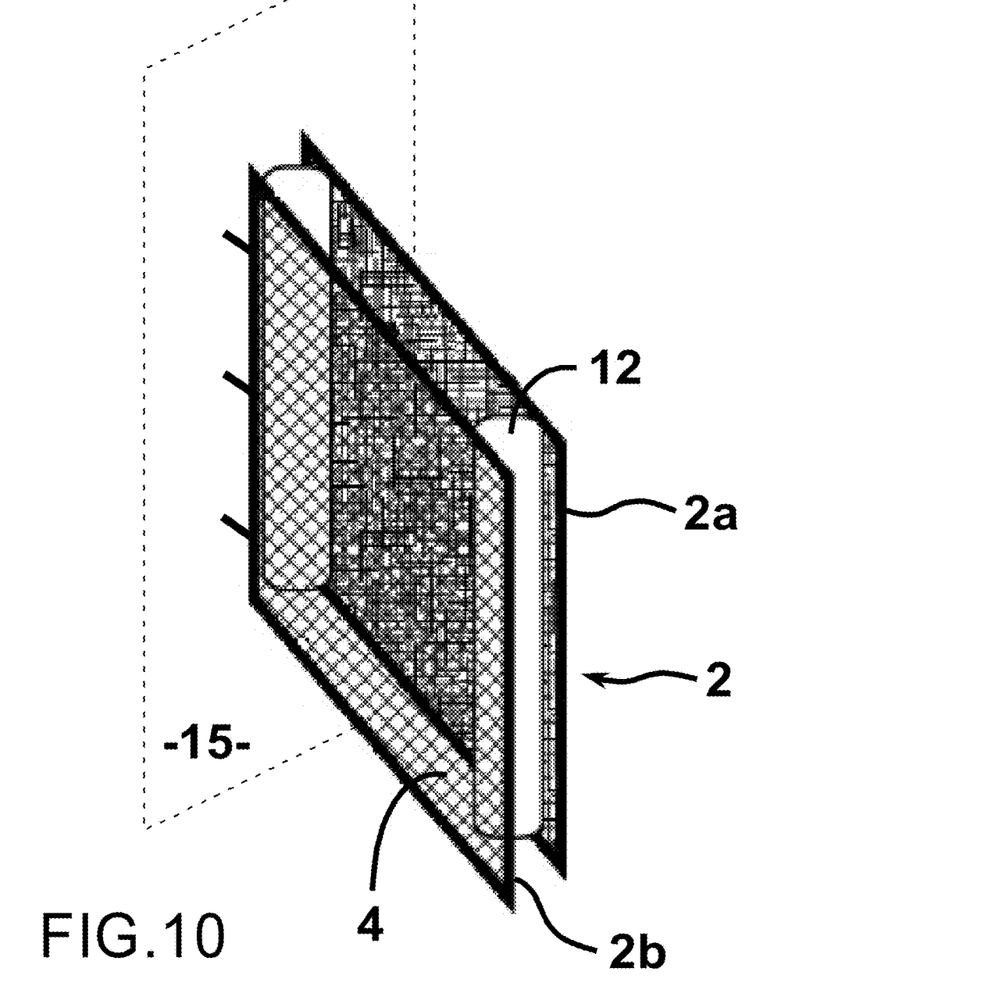
FIG. 10 shows the deformable area fastened to a fixed structure of a compartment of a vehicle.

The rear face 2b of the backrest 2, and in particular the deformable area 4, can be fastened to the fixed structure 12 of the seat 1. Alternatively, the rear faces 2b of the backrest 2, and in particular the deformable area 4, can be fastened to the compartment of the vehicle 15 comprising a set of several adjacent seats 1.

The fastening can be carried out for example by means of a reversible hook, for example a press-button, a zipper, a Velcro fastener, a screwing, a bolting, among others. Alternatively, the fastening can be carried out by means of an irreversible hook, for example by gluing, by welding, by sewing, by riveting, among others.

FIGS. 2 and 3 show respectively, in perspective and partially, a backrest 2 of seat 1 before an impact sustained on the rear face 2b of the backrest 2 and during an impact sustained on the rear face 2b of the backrest 2.

The impact can for example correspond to a punch given by the wrist P of a passenger located behind the backrest 2.

The fixed structure 12 of the seat 1, more particularly of the backrest 2, can for example comprise a recess, as shown by the space formed between the risers of the fixed structure 12, which defines the clearance space E for the deformable area 4, which extends, in this example, over the entire rear face 2b of the backrest 2 shown.

The fixed structure 12 can be made of a rigid material, for example of plastic and/or composite and/or of metal.

Before the impact, as shown in FIG. 2, the deformable area 4 of the rear face 2b of the backrest 2 is at a distance from the front face 2a of the backrest 2, with this distance forming the clearance space E. The function of the deformable area 4 is to absorb the impact exerted on the rear face 2b of the backrest 2 via elastic deformation, without transmitting it to the front face 2a of the backrest 2 and to the passenger seated on the seat 1.

As such, during the impact, as shown in FIG. 3, the deformable area 4 is deformed under the impact inside the clearance area E in order to occupy the space of the clearance area E, without however entering into contact with the front face 2a of the backrest 2 guaranteeing the non-transmission of the impact towards the passenger seated on the seat 1.

In the case of the presence of an elastically deformable material in the clearance space E, for example a foam, the latter is also deformed under the impact, and attenuates the force sustained in return by the wrist at the origin of the impact.

Figure 4:
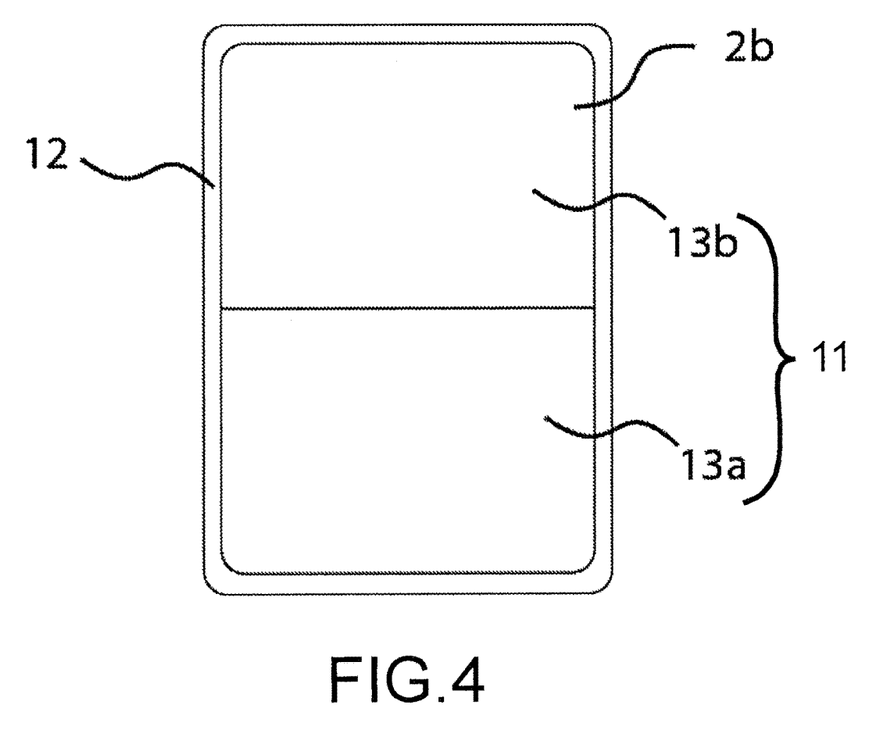
FIG. 4 is a rear view of a backrest of a seat in accordance with the invention having a rear face with a fabric structure with different penetration resistance areas.

FIG. 4 shows the rear face of a seat 1 according to the invention carried out by a first step of manufacturing of the seat 1.

In this example, a braided and/or woven and/or knitted fabric 11 is assembled, which forms the rear face 2b of the backrest, on the fixed structure 12 of the seat 1. The fabric structure 11 advantageously has two areas 13a and 13b which have different penetration resistances. More particularly, the area 13a has a penetration resistance that is higher than that of the area 13b.

This difference in penetration resistance can make it possible to define a deformable area 4. In particular, the area 13a with the highest density can correspond to the deformable area 4, being in this way sufficiently flexible to attenuate an impact but also sufficiently rigid to prevent the transmission of the impact towards the front face 2a of the backrest.

As such, the fabric structure 11 can have a resistance to penetration or higher tension in the lower area of the rear face 2b of the backrest 2 than in the upper area of the rear face 2b of the backrest 2.

Using different threads, threads made of different materials, of different braid or knit or weave forms different methods for obtaining different resistances to penetration for the fabric used.

Figure 5A:
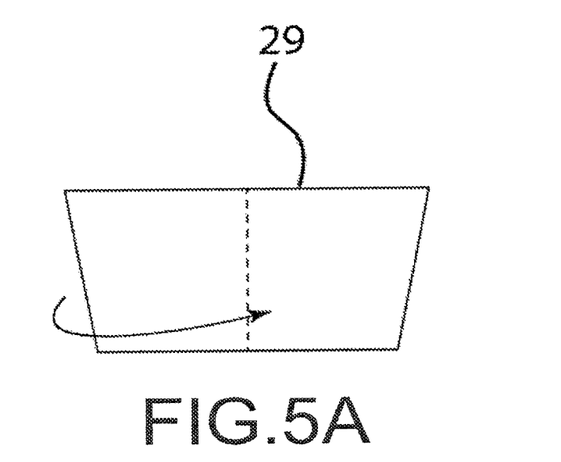
FIGS. 5A, 5B and 5C show a manner of carrying out the backrest of the seat in accordance with the invention.
Figure 5B:
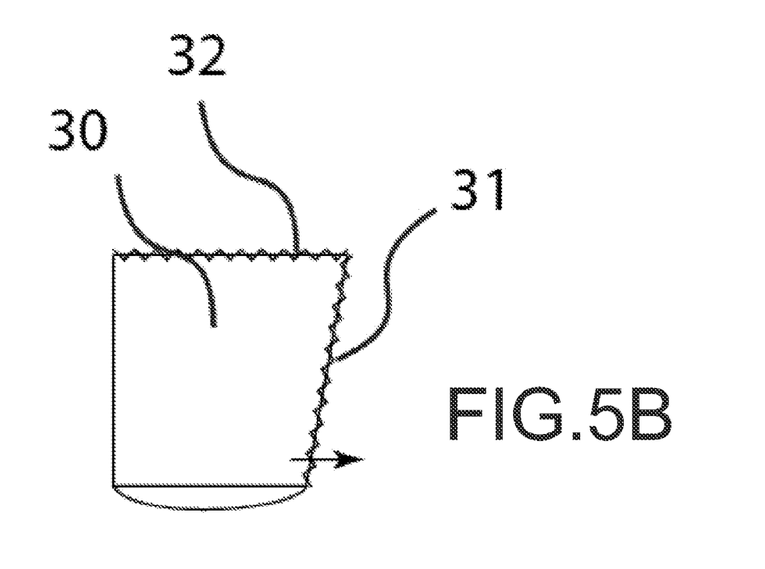
Figure 5C:
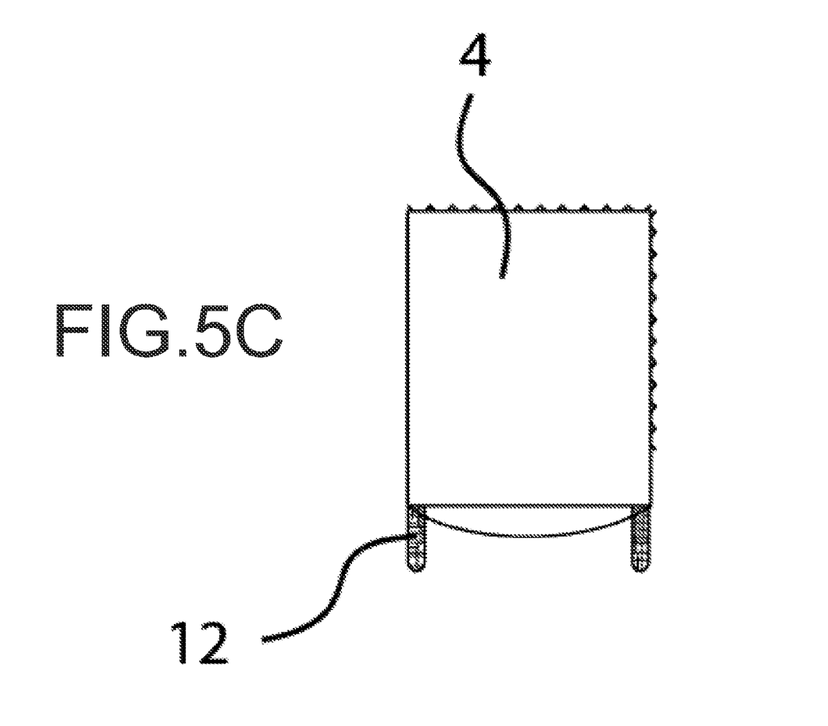

FIGS. 5A to 5C show details of an embodiment of a rear face of the backrest having a fabric surface 30 with variable tension. A deformable fabric portion 29 is cut in the shape of a trapeze, with the narrowest portion corresponding to that which in fine will be the most stretched. The cut is calculated in such a way that the narrow portion gives a particularly stretched fabric, while the wide portion corresponds to a more easily deformable surface. After folding the trapeze on itself, a seam 31 is made on the side at a slant of the trapeze formed as such. A second seam 32 can also be made on the top portion of the trapeze, in such a way as to create a sock that can slide over a rigid structure 12. The last step consists in exerting a force on the most interior corner of the trapeze in order to force the deformable area 4 to hug the shapes of the rigid structure 12. Doing this, a tension is induced on the bottom portion of the deformable area 4. This tension is retained as long as the rigid structure 12 is not deformed.

Figure 6:
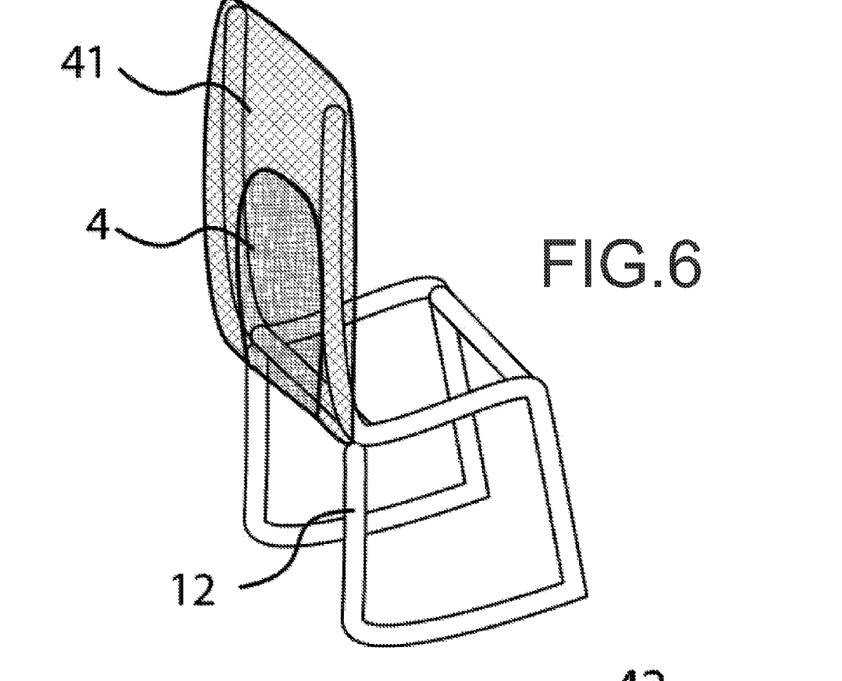
FIG. 6 shows an alternative embodiment of the seat in accordance with the invention.

FIG. 6 shows the details of an alternative mode of integrating the deformable surface within a rear face of the backrest. A metal, composite or plastic shell 41 makes it possible to form the rear face of the seat backrest. Within this rigid shell 41, a recess is made in order to insert a deformable area 4 therein. The shell 41 is attached to the seat structure 12: when the deformable area 4 sustains an impact, it can be deformed and transmit a marginal force, equal to the initial force less the force required for the deformation of the deformable area 4, to the shell 41 or directly to the seat structure 12.

Figure 7A:
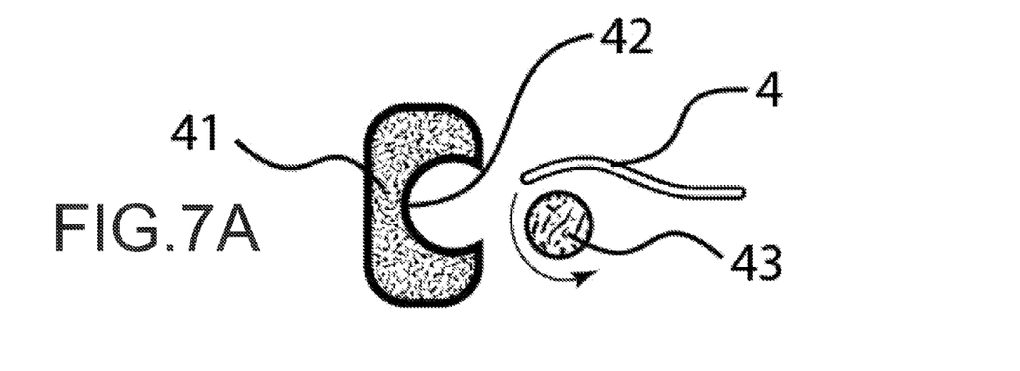
FIGS. 7A and 7B show a first method of fastening the fabric forming the backrest of the seat in accordance with the invention.
Figure 7B:
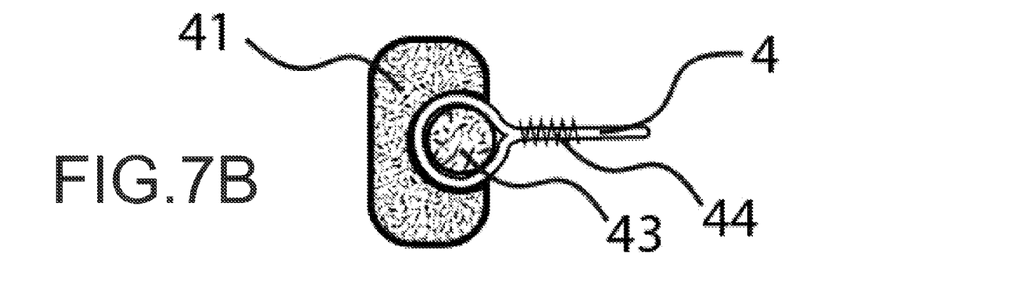

FIGS. 7A and 7B show details of a method for fastening the deformable area 4, here fabric, on a rigid shell. The rigid shell 41 has a groove 42 with a circular section of which the free angular opening is strictly less than 180°, ideally about 120°. The fabric forming the deformable area 4 is mounted around a rigid cylinder 43, for example made of plastic material, over the entire length of the groove 42 of the rigid shell 41. A seam 44 of the deformable area 4 on itself makes it possible to imprison the rigid cylinder 43. This rigid cylinder 43 is then inserted into the groove 42 with circular section of the rigid shell 41.

This method of fastening can be transposed in the case of a deformable area alone: a rail is then fixed onto the rigid structure 42 of the backrest, and the insert sewn, glued or fastened on the deformable area is inserted therein.

Figure 8:
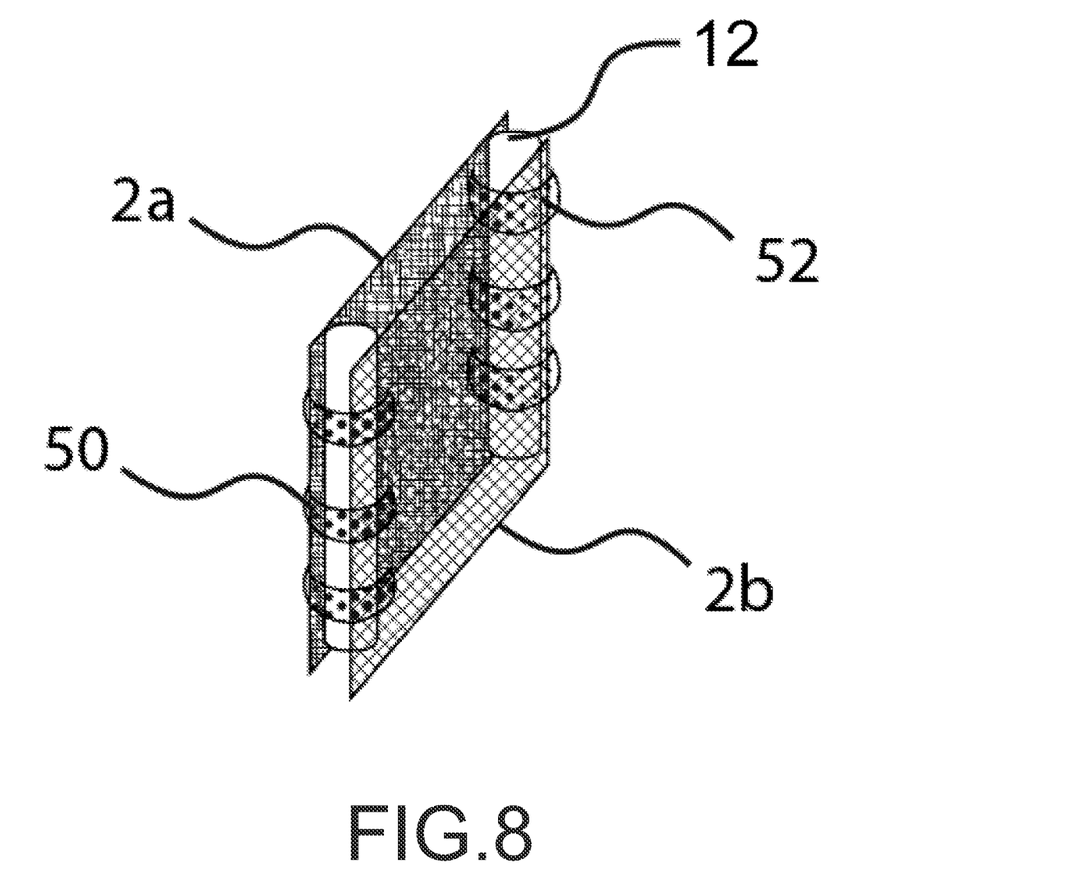
FIG. 8 shows a second method of fastening the fabric forming the backrest of the seat in accordance with the invention.

FIG. 8 shows the detail of method of fastening that uses rigid rings 50. These rings enclose the rigid structure 12 of the backrest, and make it possible to connect the rear face 26 of the backrest 2 and the front face 2a without a transfer of direct force. When one of the two faces is subjected to a tension, the resulting force is directly transmitted to the structure 12 of the backrest 2 by the ring 50, without influence on the other face. This construction allows for an excellent separation of the two faces. The rings must be arranged in order to prevent the rotation of the faces around the rigid structure 12 and therefore in the direction of the clearance space E that separates the rear face from the front face of the backrest. To do this an allowance 52 can be constructed on the ring 50 on the clearance space E. The front and rear faces must have slots that allow for the insertion of the ring 50. These slots must be large enough so that the ring 50 can be inserted, but small enough so that the fabric cannot slide on the allowance 52 of the ring 50. These slots are weak points of the front and rear faces and must consequently be reinforced, either by means of finishing stitches, or by adding a second component in order to rigidify the slot (another more rigid fabric material, composite, metal or plastic cut for example).

Of course, the invention is not limited to the embodiments that have just been described. Various modifications can be made to them by those skilled in the art.

In particular, the deformable area or areas 4 could also be located, and even solely, on the seat part or parts 3 of the seats 1 described hereinabove, more precisely on the lower face or faces 3b of the seat part or seat parts 3, in particular in order to prevent impacts sustained in the seat parts, for example kicks from passengers located to the rear.

The expression "comprising a" must be understood as being synonymous with "comprising at least one", unless specified otherwise.

The invention claimed is:

1. Vehicle seat for a passenger, comprising:
   a fixed structure defining a backrest and a seat part, the backrest having a front face and a rear face opposite the front face, and the seat part having an upper face and a lower face opposite the upper face;
   at least one of the rear face of the backrest and the lower face of the seat part comprising at least one area that is deformable in the event of an impact, respectively towards the front face of the backrest or towards the upper face of the seat part;
   at least one of the front and rear faces of the backrest, and the upper and lower faces of the seat part, being located at a distance from one another, at least at said at least one deformable area, so as to define a clearance space; and
   said at least one area that is deformable of the rear face of the backrest of the lower face of the seat part being configured so as to deform, in the event of an impact sustained on the rear face of the backrest and the lower face of the seat part, in the clearance space without transmitting the impact, respectively in the front face of the backrest and the upper face of the seat part,
   wherein the rear face of the backrest and the lower face of the seat part comprising said at least one area that is deformable comprises at least one of a uniformly braided, woven, knitted fabric, said at least one area that is deformable being obtained through a geometrical configuration that is different from the fixed structure of the seat in relation to the geometrical configuration of the deformable area before it is fastened onto the fixed structure.

2. Seat according to claim 1, wherein said at least one area that is deformable is configured in order to be deformed, in the event of an impact sustained on the rear face of the backrest and/or the lower face of the seat part, in the clearance space without entering into contact respectively of the front face of the backrest and/or the upper face of the seat part.

3. Seat according to claim 1 wherein the rear face of the backrest and/or the lower face of the seat part comprising said at least one area that is deformable comprises at least one of a braided, woven, knitted fabric having at least two areas-that have different penetration resistances.

4. Seat according to claim 1, wherein said at least one area that is deformable extends over at least one recess made in a shell of the fixed structure of the seat, with the thickness of the fixed structure-defining the clearance space, the shell of the fixed structure being made of a rigid material which is at least one of a composite and/or plastic and/or of metal.

5. Seat according to claim 1, wherein the rear face of the backrest and/or the lower face of the seat part comprising said at least one area that is deformable is fastened to the fixed structure of the seat by means of at least one reversible hook chosen from a press-button, a zipper, a hook-and-loop fastener, a screwing and/or a bolting.

6. Seat according to claim 1, wherein the rear face of the backrest and/or the lower face of the seat part comprising said at least one area that is deformable is fastened to the fixed structure of the seat by means of at least one irreversible hook chosen from gluing, welding, sewing and/or riveting.

7. Seat according to claim 1, wherein the clearance space is empty.

8. Seat according claim 1, wherein the clearance space is filled with an elastically deformable material.

9. Set of at least two adjacent vehicle seats, each of which comprises:
   a fixed structure defining a backrest and a seat part, the backrest having a front face and a rear face-opposite the front face, and the seat part having an upper face and a lower face opposite the upper face;
   at least one of the rear face of the backrest and the lower face of the seat part comprising at least one area that is deformable in the event of an impact, respectively towards the front face of the backrest or towards the upper face of the seat part; and
   at least one of the front and rear faces of the backrest and the upper and lower faces of the seat part being located at a distance from one another, at least at said at least one deformable area so as to define a clearance space,
   said at least one area that is deformable of the rear face of the backrest and of the lower face of the seat part being configured so as to deform, in the event of an impact sustained on the rear face of the backrest or the lower face of the seat part, in the clearance space without transmitting the impact, respectively in the front face of the backrest and/or the upper face of the seat part,
   wherein the rear face of the backrest or the lower face of the seat part comprising said at least one area that is deformable comprises at least one of a uniformly braided, woven, or knitted fabric, said at least one area that is deformable being obtained through a geometrical configuration that is different from the fixed structure of the seat in relation to the geometrical configuration of the deformable area before it is fastened onto the fixed structure, and
   wherein at least one same deformable area is common to said at least two seats, extending on the rear faces of the backrests of the at least two seats or on the lower faces of the seat parts of said at least two seats.

10. Vehicle according to claim 9 wherein the rear face of the backrest and/or the lower face of the seat part comprising said at least one area that is deformable is fastened to a fixed structure of at least one seat.

11. Vehicle according to claim 9 wherein the rear face of the backrest or the lower face of the seat part comprising said at least one area that is deformable is fastened to a fixed structure of a compartment of the vehicle.

12. Method for manufacturing a vehicle seat according claim 1, comprising the steps of:
   cutting a braided and/or woven and/or knitted fabric in the shape of a trapeze, in such a way that the narrow portion gives a particularly stretched fabric, while the wide portion corresponds to a more easily deformable surface;
   folding the trapeze on itself to form a new narrow portion, a new wide portion and a slanted side;
   sewing the slanted side, and possibly sewing the new wide portion in such a way as to create a sock; and
   stretching the new narrow portion to create an aperture large enough to engage the rigid structure into this aperture, and slide it over the rigid structure.

* * * * *